Oct. 13, 1964  H. B. MALONEY ETAL  3,152,720
FEED AND TRANSFER METHOD AND APPARATUS
Filed July 27, 1960  2 Sheets-Sheet 1

TIMING CHART

INVENTORS
HENRY B. MALONEY
ROBERT D. CORWIN
BY Robert F. O'Connell
ATTORNEY

Oct. 13, 1964     H. B. MALONEY ETAL     3,152,720
FEED AND TRANSFER METHOD AND APPARATUS
Filed July 27, 1960                    2 Sheets-Sheet 2

INVENTOR
HENRY B. MALONEY
ROBERT D. CORWIN
BY Robert J. O'Connell
ATTORNEY

United States Patent Office 3,152,720
Patented Oct. 13, 1964

3,152,720
FEED AND TRANSFER METHOD AND APPARATUS
Henry B. Maloney, Wakefield, and Robert D. Corwin, Framingham, Mass., assignors to Raytheon Company, Lexington, Mass., a corporation of Delaware
Filed July 27, 1960, Ser. No. 45,676
5 Claims. (Cl. 221—1)

The present invention relates to a process and apparatus for handling minute parts and more particularly for individually selecting and transferring minute semiconductor elements to an assembly with other parts and further processing in the manufacture of transistors.

In the manufacture of transistors and/or crystal diodes, for example, it is customary to insert in exactly spaced and formed cavities in a carbon tray minute indium balls or germanium wafers. These components are held in precise relationship one with another and with a metallic strip generally made of nickel by the exactly spaced cavities and are alloyed into an assembly by exposure to a suitably elevated temperature in a furnace.

Heretofore, the assembling operation has been performed manually and with great difficulty on the part of operators using tweezers or some similar device. Such operations are of necessity quite slow, the maximum rate being of the order of 600–700 per hour, and are particularly fatiguing to the eyes as the indium balls are about .009 inch and .014 inch in diameter and the germanium wafers are .043 inch square.

The present invention relates to and has as an object the provision of an improved apparatus for assembling devices of the above type.

It is another and an important object of the invention to provide for the more economical production of these devices as well as to insure greater uniformity of the resulting product particularly with respect to its electrical characteristics and its ruggedness.

It is a still further object of the present invention to provide a method of and an apparatus for assembling semiconductor devices capable of operating at the rate of at least 1200 per hour and operating at the rate of 6,000 per hour by the provision of simple modifications thereby achieving substantial savings in manufacturing costs.

In accordance with the preferred embodiment of the invention illustrated herein by way of example for assembling semiconductor devices, minute parts such as, for example, indium balls to be selected and transferred to a carbon assembly tray having a plurality of cavities to receive the said parts are deposited in an orientating bowl having a plurality of cavities adjacent its periphery. Each cavity is formed to receive one part. The orientating bowl is preferably indexed twice to each cycle of a transfer arm. One index occurs while the bowl axis is at about 45 degrees to permit cavities to be continuously filled with correctly positioned parts and the other index occurs when the bowl axis is in the perpendicular or vertical position for transfer of a part. After the first index when the axis of the bowl is at approximately 45 degrees, the bowl is pivoted such that its axis is in the perpendicular position. The bowl dwells in this position and a vacuum transfer arm swings into pick up position directly over a presumably loaded cavity and descends to pick up a part. The vacuum transfer arm then rises and the second index of the bowl referred to herein above occurs. The vacuum transfer arm again drops to the pick up position and if for any reason it fails to pick up a part on the first attempt it makes a second effort to do so. If the first effort to pick up a part is successful a vacuum nozzle carried by the transfer arm holds the part and hence nothing can be picked up on the second attempt since the vacuum is blocked. However, if the first attempt is unsuccessful for any reason the vacuum is not blocked and hence a part will be picked up on the second attempt. After the pick up portion of the transfer arm cycle is completed, the vacuum transfer arm is then caused to rise and swing approximately 90 degrees to a position immediately over an empty cavity in one of the carbon assembly trays whereafter, still holding the part to be transferred, it is caused to drop to a level just below the top surface of the tray and slightly inside a properly located cavity. Thereafter the vacuum is cut thereby releasing the transferred part to its correct position in the cavity in the carbon assembly tray. The carbon assembly tray may thereafter be indexed to the next position to present another empty cavity and the cycle described hereinabove is repeated.

The above and other objects and features of the invention, together with the incident advantages, will be more readily understood and appreciated from the following detailed description of the preferred embodiment thereof selected for purposes of illustration and shown in the accompanying drawings, in which.

Figure 2:
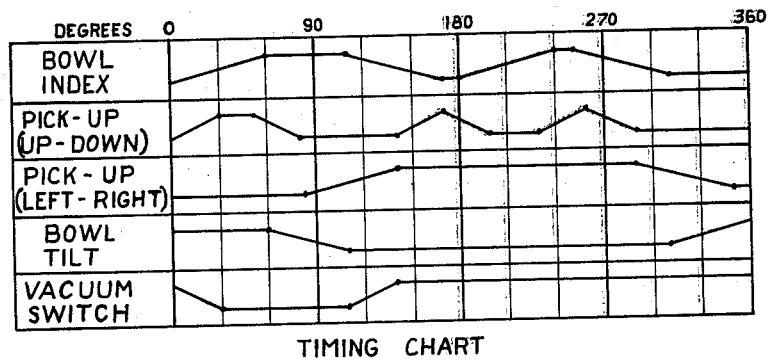
FIG. 2 is a diagram to indicate the movement of the parts for a complete rotation of the controlling camshaft.
Figure 1:
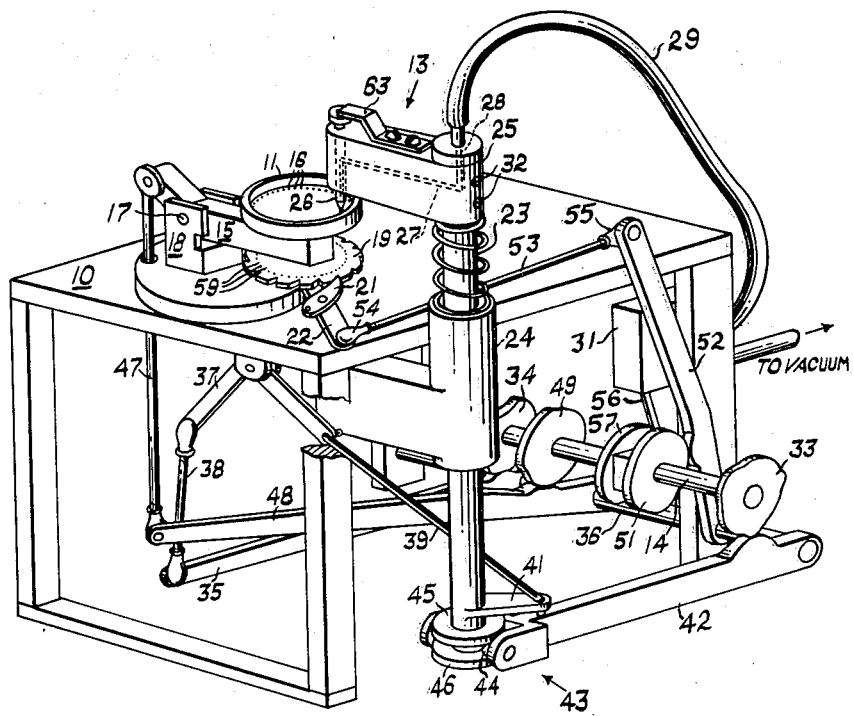
FIG. 1 is a pictorial view of apparatus embodying the present invention.

With reference now to FIG. 1 which shows a preferred or selected embodiment of the present invention with the parts in their position corresponding to 170 degrees on the timing chart of FIG. 2, a base or table 10 is shown supporting an orientating bowl 11, a vacuum transfer arm 13, the controlling camshaft 14 and cams, and means actuated by the cams for controlling the movements of the orientating bowl 11 and the vacuum transfer arm 13.

The orientating bowl 11 rotatably mounted on a shaft 12 (see FIG. 3) passing through one end of a bell crank 15 is formed from carbon or any suitable material that does not have an affinity for the parts such as, for example, indium or germanium. As shown, the orientating bowl 11 is generally cup-shaped and provided with a plurality of equally spaced cavities 16 accurately formed and located adjacent the inner periphery of the bowl. The bell crank 15 is pivotally supported intermediate its ends as at 17 in a support 18 attached to the table 10. An indexing wheel 19 is fixedly attached to the opposite end of the bowl shaft and cooperates with a spring-loaded pawl 21 rotatably carried on an arm 22 rotatably attached to said bowl shaft 12. Obviously, as arm 22 is moved from its forward position as shown to its rearward position the orientating bowl 11 will be indexed a predetermined amount and each cavity will be consecutively presented to or located at a predetermined location or point.

The vacuum transfer arm 13 is comprised of a shaft 23 vertically movable in a guide 24 carried by the table 10, an outwardly extending arm 25 perpendicular to the shaft 24, and a nozzle 26 removably mounted in the extreme end of arm 25 and parallel to the shaft 24. Nozzle 26 is adjusted such that when the orientating bowl 11 is in the horizontal position as shown it is aligned with and is immediately adjacent one of the cavities 16 in the orientating bowl. A vacuum connection to the nozzle 26 is made through passages 27–28, rubber tube 29, and a vacuum switch or valve 31 for opening the vacuum connection to the nozzle when the vacuum transfer arm is in its down and extreme clockwise position as more fully described hereinafter. The passage 28 is flexibly connected, as by means of the rubber tube 29 to the vacuum switch 31.

Arm 25 is adjustably mounted on the shaft 23 as by means of set screws 32 in order to allow for lost motion and the like in the actuation of the vacuum transfer arm. Suitable stops of any type (not shown) may be provided to engage arm 25 or bell crank 37 to prevent over-travel.

The orientating bowl and vacuum transfer arm are operated by shaft 14, directly or indirectly driven from a suitable power source, not shown, and carrying a series of cams which control the operation of the various parts in the desired sequence as shown graphically in FIG. 2. The vertical reciprocation and radial oscillation of the shaft 23 are respectively controlled by two cams 33 and 34. The cam 34, for radially oscillating shaft 23 and hence the vacuum transfer arm 13, engages a follower arm or lever 35 having one end rotatably carried by a shaft 36 and a free end connected to one arm of a bell crank 37 pivotally connected to the under surface of the table 10 through a connecting rod 38. The opposite end of bell crank 37 is connected through a connecting rod 39 to arm 41 fixedly attached to the lower end of shaft 23. Vertical movement of the free end of lever 35 results in radial oscillation of the vacuum transfer arm 13 through connecting rods 38-39 and the bell crank 37. The cam 33 for vertical reciprocation of the vacuum transfer arm 13 engages a follower arm or lever 42 having one end rotatably attached to shaft 36 and having a U-shaped portion 43 at its free end. The U-shaped portion 43 is provided with trunnions 44 normally engaging between upper and lower abutments 45-46 on shaft 23, in order to allow for raising and lowering the vacuum transfer arm 13 and a part when picked up by the vacuum transfer arm. In this way provision is made for not only rotating, but also simultaneously reciprocating the vacuum transfer arm and imparting corresponding movement to the part picked up by the vacuum transfer arm.

Returning now to the orientating bowl 11, vertical oscillation thereof is achieved by means of the connecting rod 47 pivotally connected to the end of bell crank 15 opposite the orientating bowl and to the free end of a follower arm or lever 48 the opposite end of which is pivotally mounted on shaft 36. Cam 49 mounted on shaft 14 engages lever 48 in conventional manner to cause the bell crank 15 and hence the orientating bowl to pivot about point 17. In this manner the orientating bowl is tipped or oscillated from a horizontal position as shown in FIG. 1 to an elevated position at an angle of about 45 degrees with respect to the horizontal.

Cam 51 for indexing the orientating bowl 11 engages a follower arm or lever 52 pivotally mounted on shaft 36. The free end of lever 52 is connected to arm 22 through a connecting rod 53. Connecting rod 53 is connected to arm 22 and lever 52 by means of ball joint connection 54-55 to permit indexing of the bowl 11 in both its horizontal and elevated position. The orientating bowl and associated means perform the function of consecutively isolating and presenting parts at a predetermined location or point. The vacuum control switch 31 is actuated through a follower arm or lever 56 and cam 57 carried by shaft 14. In the interests of descriptive clarity springs and other conventional tensioning devices necessary to hold the various cams and follower arms in constant contact have been omitted. The function, connection, and location of such conventional devices are deemed to be so obvious and well-known to those skilled in the art as to not require discussion herein.

Figure 3:
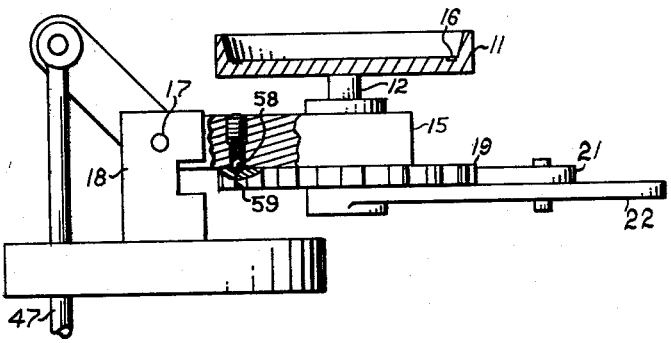
FIG. 3 is a side view with parts broken away showing the orientating bowl and its associated parts, and, FIG. 4 is a pictorial view showing the relation of the orientating bowl, transfer arm, and assembly trays.

FIG. 3 shows the orientating bowl assembly in greater detail. The ball stop 58 carried in bell crank 15 engages indents 59 in the indexing wheel 19. Indents 59 are so located and spaced one from another to provide accurate orientation of the cavities 16 in the orientating bowl each time the orientating bowl is indexed. Obviously, the number of indents will equal the number of cavities.

Figure 4:
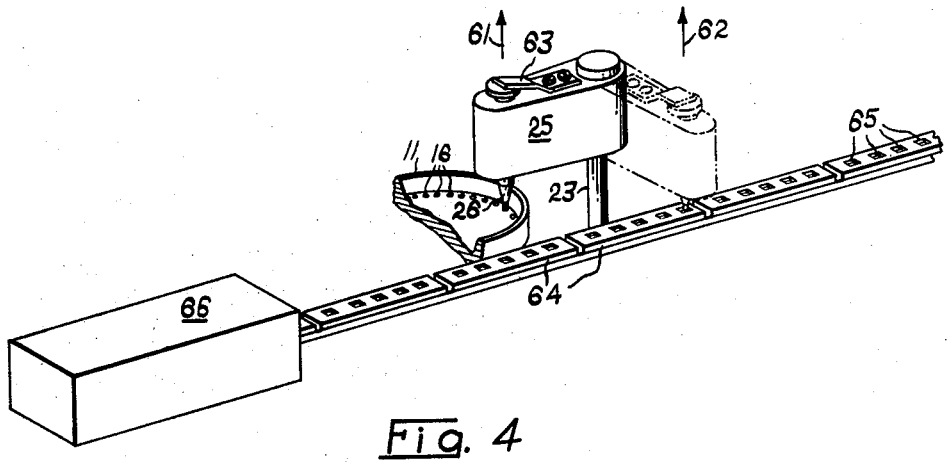

FIG. 4 shows the transfer arm 13 in its pick-up and unloading position, the unloading position being shown in phantom. The arrows 61-62 indicate that the transfer arm moves upwardly from each of the aforementioned positions. Spring member 63 is provided to retain the nozzle 26 in position while permitting the nozzle 26 to move vertically to compensate for over travel of the arm 25 in the downward direction. Assembly trays 64 each having a plurality of cavities 65 are indexed the proper amount by any suitable means (not shown) toward the furnace 66 to present an unfilled cavity 65 each time the transfer arm 13 descends to unload a part.

Referring now to FIG. 2, there is shown a chart which represents what happens during one complete revolution, or turning of the camshaft 14 through 360 degrees. As pointed out hereinbefore the orientating bowl 11 is indexed twice during the movement of the controlling camshaft 14 through 360 degrees, as indicated by the line marked "bowl index." The orientating bowl 11 is indexed the first time during the movement of the controlling camshaft 14 from zero to 60 degrees and dwells in this position during movement of the controlling camshaft through the next succeeding 50 degrees. Indexing of the bowl is effected by cam 51 which causes lever 52 to move in a clockwise direction and arm 22 to move in a counterclockwise direction thereby causing the orientating bowl to be indexed in a counterclockwise direction. During the next succeeding 60 degrees of movement of the controlling camshaft 14 arm 22 is returned to its clockwise position and it remains or dwells in this position for the next succeeding 10 degrees prior to the second indexing operation. During the next succeeding 60 degrees of movement of the controlling camshaft 14 the orientating bowl 11 is indexed the second time and it remains or dwells in this position for the next succeeding 10 degrees of movement of the controlling camshaft. Arm 22 now again being in its counterclockwise position, is returned to its clockwise position during the next succeeding 60 degrees of movement of the controlling camshaft where it remains for 50 degrees to complete one cycle of the controlling camshaft. Tilting of the orientating bowl effected by cam 49 is indicated by the line marked "bowl tilt." The orientating bowl dwells in the up position for the first 60 degrees of movement of the controlling camshaft and is lowered to its down position during the next succeeding 50 degrees of movement of the controlling camshaft. During the next succeeding 200 degrees of movement of the controlling camshaft the orientating bowl dwells in its down position and during the next succeeding 50 degrees of movement of the controlling camshaft it is raised to its up position to complete one full cycle of the controlling camshaft.

The up-down motion or reciprocation of the vacuum transfer arm is effected by cam 33 and is represented by the line marked "pick-up (up-down)." During the first 30 degrees of movement of the controlling camshaft the vacuum transfer arm descends to its unloading position and dwells in this position for the next succeeding 20 degrees of movement of the controlling camshaft. Thereafter for the next succeeding 30 degrees of movement of the controlling camshaft the vacuum transfer arm is raised to its up position where it remains or dwells for the next succeeding 60 degrees of movement of the controlling camshaft. The dual attempt of the vacuum transfer arm to pick up a part from a cavity in the orientating bowl now occurs, each down motion and up motion occurring during 30 degrees of movement of the controlling camshaft. After the first attempt the vacuum transfer arm dwells in the up position for 30 degrees (during movement of the controlling camshaft from 200 to 230 degrees) and after the second atempt the vacuum transfer arm dwells in the up position for 70 degrees (290 degrees to 360 degres).

The left-right or counterclockwise-clockwise motion of the vacuum transfer arm is shown by the line marked "pick-up (left-right)." During movement of the controlling camshaft through 90 degrees (from 350 degrees to 80 degrees) the vacuum transfer arm remains in its left or counterclockwise position during which time it descends to deposit a part in the assembly tray, remains in this position, and then moves to its up position in timed relation with the orientating bowl as described hereinbefore. During the next 60 degrees of movement of the controlling camshaft and while the vacuum transfer arm dwells in its up position it is turned to its right or clockwise position and remains in this position during the next succeeding 150 degrees of movement of the controlling camshaft during which time the vacuum transfer arm completes its two attempts to pick up a part. During the next succeeding 60 degrees of movement of the controlling camshaft (from 290 degrees to 350 degrees) the vacuum transfer arm is turned to its left or counterclockwise position to complete a full cycle of the controlling camshaft. The right-left or counterclockwise-clockwise movement of the vacuum transfer arm is effected by cam 34.

The lower line marked "vacuum switch" shows that for the first 30 degrees of movement of the controlling camshaft the vacuum is broken to allow a part to be deposited in the assembly tray and that the vacuum remains off for the next succeeding 80 degrees of movement of the controlling camshaft. Thereafter, during the next succeeding 30 degrees of movement of the controlling camshaft the vacuum switch is closed by cam 57 to allow a part to be picked up from the orientating bowl and a vacuum is provided at the nozzle 26 for the next succeeding 220 degrees of movement of the controlling camshaft to complete a full cycle of the controlling camshaft.

Inasmuch as the mechanical linkage and connections described hereinabove will for a practical embodiment contain a certain amount of lost motion conventional adjusting screws, stops or the like (not shown) may be provided to insure accurate location and/or motion of the orientating bowl and the vacuum transfer arm.

While the present invention has been described in its preferred embodiment, it is realized that modifications may be made, and it is desired that it be understood that no limitations on the invention are intended other than may be imposed by the scope of the appended claims.

What is claimed is:

1. In a machine for handling minute parts, the combination comprising: a bowl having a plurality of cavities spaced apart adjacent to the inner periphery thereof for receiving said parts, said bowl being journaled for rotation; means for actuating said bowl to cause a part to be located in each of said cavities and consecutively presented at a predetermined first position, said means including means to pivot said bowl about an axis perpendicular to the longitudinal axis of the bowl and means to index said bowl about its longitudinal axis by an amount equal to the spacing of said cavities; means for transferring a part presented to said first position to a second position including a nozzle movable to and away from said first and second positions, said nozzle being of a size less than that of said parts; means for providing a vacuum at said nozzle in timed relation with transfer means to hold a part at said nozzle; and means for actuating said transfer means and said vacuum means in timed relation one with another and with said means for actuating said bowl for consecutively selecting a part presented to said first position and depositing it at said second position.

2. In a machine for handling similar minute parts, the combination comprising: a bowl having a plurality of cavities spaced apart an equal amount and adjacent to the inner periphery thereof for receiving said parts, said bowl being journaled for rotation; first means for tipping said bowl in a direction to cause parts in said bowl to move away from a predetermined first position; second means for indexing said bowl about its longitudinal axis by an amount equal to the spacing of said cavities to consecutively present said cavities at said first position; means for transferring a part presented to said first position to a second position including a nozzle movable to and away from said first and second positions, said nozzle being of a size less than that of said part; means for providing a vacuum at said nozzle in timed relation with said transfer means to hold a part at said nozzle; and means for actuating said transfer means and said vacuum in timed relation one with another and with said first and second means for consecutively selecting parts presented to said first position and depositing them at said second position.

3. In a machine for handling similar minute parts, the combination comprising: a bowl having a plurality of cavities spaced apart an equal amount and adjacent to the inner periphery thereof for receiving said parts, said bowl being journaled for rotation; first means for tipping said bowl in a direction to cause parts in said bowl to move away from a predetermined first point; second means for indexing said bowl about its longitudinal axis by an amount equal to the spacing of said cavities to consecutively present said cavities at said first point; adjustable mechanism for transferring a part presented to said first point to a second point comprising a guide, a shaft slidably mounted in said guide, an arm attached to one end of said shaft located above and extending over said bowl, a nozzle carried by the free end of said arm parallel with said shaft, third means reciprocating said shaft for moving said nozzle to and away from said first and second points, fourth means for rotating said shaft about its longitudinal axis between said first and second points, fifth means for providing a vacuum at said nozzle to hold a part thereat; and means for actuating said first, second, third, fourth and fifth means in timed relation one with another for consecutively selecting parts presented to said first point and releasing them at said second point.

4. In a machine for handling similar minute parts, the combination comprising: a base; a first arm pivotally mounted on said base; an orientating bowl having a plurality of cavities spaced apart an equal amount and adjacent to the inner periphery thereof for receiving said parts, said bowl being journaled for rotation adjacent the free end of said arm; first means for pivoting said first arm and tipping said bowl in a direction to cause parts in said bowl to move away from a predetermined first position; second means for indexing said bowl in any position about its longitudinal axis by an amount equal to the spacing of said cavities to consecutively present said cavities at said first position; adjustable mechanism for transferring a part presented to said first position to a second position comprising a guide carried by said base, a shaft slidably mounted in said guide, a second arm attached to one end of said shaft located above and extending over said bowl, a nozzle carried by the free end of said second arm parallel with said shaft, said nozzle being of a size less than that of said parts, third means reciprocating said shaft for moving said nozzle to and away from said first and second positions, fourth means for rotating said shaft about its longitudinal axis between said first and second positions, fifth means for providing a vacuum at said nozzle to hold a part thereat; and means for actuating said first, second, third, fourth and fifth means in timed relation one with another for consecutively selecting parts presented to said first position and depositing them at said second position.

5. The method of handling minute articles comprising: tipping from a first position to a second position a bowl, containing a plurality of cavities spaced apart an equal distance and adjacent the inner periphery thereof, in a direction to cause articles not located in said cavities to move away from a first point; returning said bowl to said first position; indexing said bowl to successively present a cavity at said first point; swinging a vacuum nozzle over said first point; lowering said nozzle to said first point in timed relation with indexing of said bowl to cause an article to be held at said nozzle by said vacuum; raising and swinging said nozzle to a position over a second point displaced from said first point; and breaking the vacuum to release the article held thereby.

References Cited in the file of this patent

UNITED STATES PATENTS

| | | |
|---|---|---|
| 1,828,174 | Clemens | Oct. 20, 1931 |
| 2,455,701 | Putman et al. | Dec. 7, 1948 |
| 2,550,920 | Gilbert | May 1, 1951 |
| 2,605,590 | Young et al. | Aug. 5, 1952 |
| 2,778,478 | Brook | Jan. 22, 1957 |
| 2,786,442 | Keefer | Mar. 26, 1957 |
| 2,819,805 | Vieth | Jan. 14, 1958 |
| 2,832,505 | Stutske | Apr. 29, 1958 |
| 2,885,117 | Gannoe | May 5, 1959 |
| 2,891,668 | Hunt | June 23, 1959 |
| 3,033,416 | Russell et al. | May 8, 1961 |